UNITED STATES PATENT OFFICE.

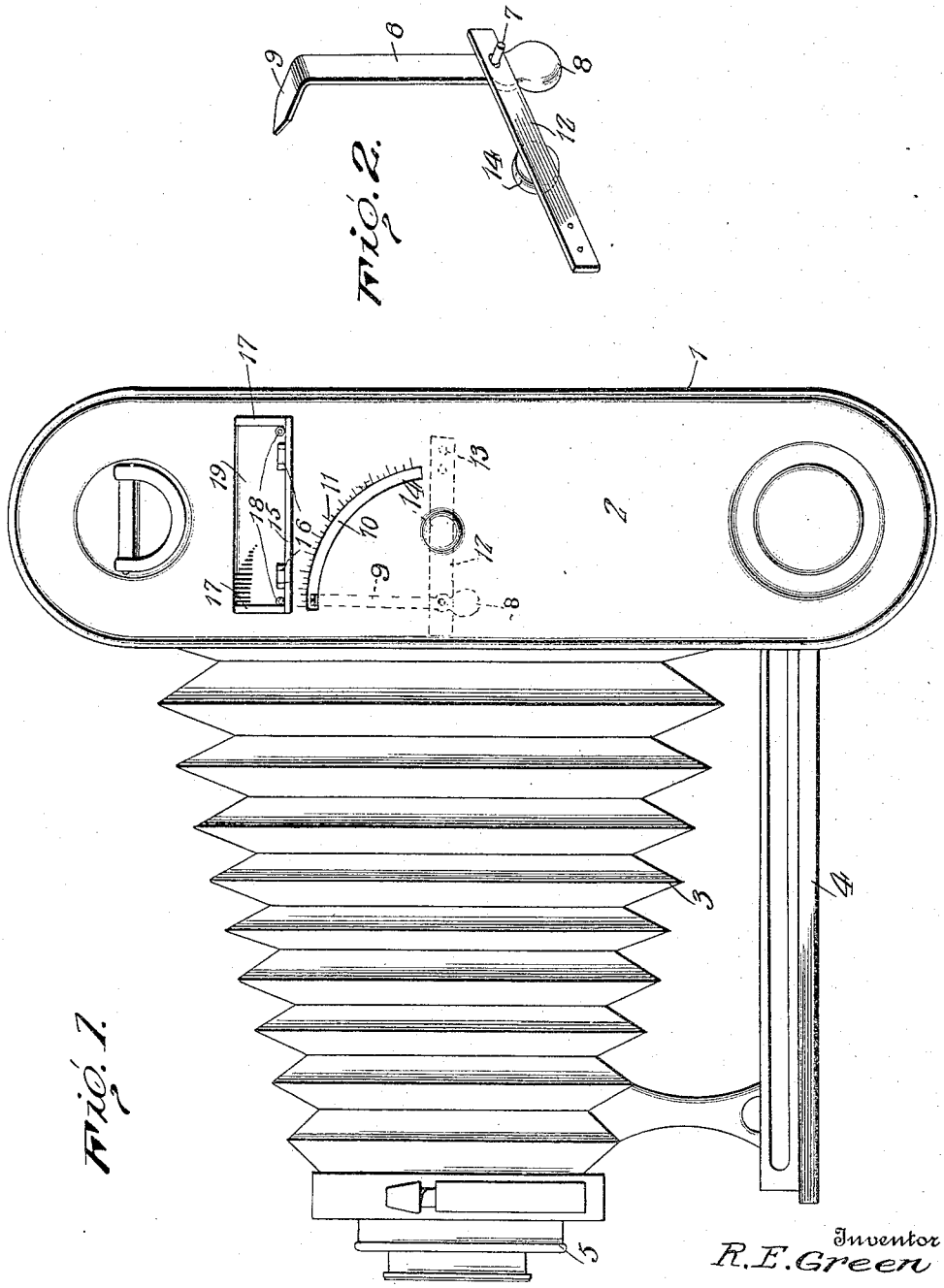

ROY E. GREEN, OF PEACHAM, VERMONT.

RANGE-FINDER FOR CAMERAS.

1,215,647.  Specification of Letters Patent.  Patented Feb. 13, 1917.

Application filed April 13, 1916. Serial No. 90,893.

*To all whom it may concern:*

Be it known that I, ROY E. GREEN, a subject of the King of Great Britain, residing at Peacham, in the county of Caledonia and State of Vermont, have invented certain new and useful Improvements in Range-Finders for Cameras, of which the following is a specification.

The present invention relates to photography, and more particularly to new and useful improvements in range finders for cameras.

The primary object of my invention is to provide a range finder for cameras which will automatically indicate when an object is sighted, the probable distance between the camera and the object to be photographed.

Another object of my invention is to provide a device of the class described capable of application to any of the various types of cameras now in use, the device indicating upon a dial or scale the range.

Other objects and advantages to be derived from the use of my improved range finder for cameras will appear from the following detail description and the claims, taken with an inspection of the accompanying drawings, in which—

Figure 1 is a side elevation of a folding kodak showing my improved range finder applied thereto, and Fig. 2 is an enlarged perspective view of the indicator of my invention.

Referring more particularly to the drawings, wherein similar characters of reference designate like and corresponding parts throughout the various views, 1 designates the body of a camera of the usual form, my invention being mounted in one of the end walls 2 thereof. The camera is provided with the usual bellows 3, supports 4, and lens holder 5.

Specifically referring to my invention, the same consists preferably of an indicator arm 6 mounted on a pin 7 carried by the wall 2 of the camera, said indicator arm having a weighted end 8 and a laterally bent finger portion 9. The finger portion 9 projects through an arcuate aperture 10 formed in the side wall 2. A scale 11 is formed about said aperture and is preferably graduated to indicate the distance in feet.

In order to maintain the arm 6 in a position to which the same has swung, I provide a flat strip 12 permanently attached at 13 to the inner face of the wall 2. The strip 12 is provided with an aperture slightly larger than the pin 7, whereby the free end of said strip will normally lie in gripping engagement with the arm 6 adjacent the pivot point thereof. A knob or button 14 is arranged in a suitable recess (not shown) formed in the wall 2 and covered by the usual leather covering employed on cameras. The button 14 is normally in engagement with the spring strip 12 and when the button is pressed from the exterior of the camera the strip 12 is caused to move out of engagement with the arm permitting its free movement. When the arm has reached a predetermined point, the same is held in the position last reached by the spring arm 12 returning to normal position.

I provide a sighting device arranged on the side wall 2 of the camera, said sighting device comprising a base portion 15 hinged at 16 to the side wall and provided with end plates 17 hinged at 18 to said base. This formation permits folding of the sighting device into a recess 19 formed in the wall 2. The plates 17 are provided with the usual sight openings for alining the camera when taking a photograph.

It will be readily seen that when the camera is raised or lowered during a sighting operation the arm 6 will be caused to swing through the arc of a circle and when the camera has been set at the proper elevation, that is when holding the camera level as possible and the ground line of the object to be photographed is centered in the sight openings in the plates 17, the spring arm 12 is to be released holding the arm 6 in the position to which the same has last moved. The indication thus obtained apprises the photographer as to the approximate distance which the object to be photographed is away. It will be readily apparent that the sighting device 15 may be readily folded within the recess by swinging the end plates 17 down on to the main base portion thereof.

From the above description taken in connection with the accompanying drawings, it is thought that a clear and comprehensive understanding of the construction, operation and advantages of my invention may be had, and while I have shown and described my invention as embodying a specific structure, I desire that it be understood that I may make such changes on said structure as do not depart from the spirit and scope of the invention as described.

What I claim as new and desire to secure by Letters Patent is:

1. In a range finder, a camera having a side wall provided with an arcuate elongated aperture, an indicating arm pivoted on said side wall and having a laterally extending finger projecting through said aperture, means for retaining said arm in a position predetermined upon the movement of the camera, and a foldable sighting device carried by said side wall.

2. In a range finder a camera, an arm pivoted to the side wall of the camera and having a weighted extremity, said wall having an arcuate scale adjacent the free end of said arm, and a spring arm carried by said camera wall for engagement with first said arm to retain the same in a position to which the same is moved.

3. In a range finder, in combination with a camera having a side wall, a pin mounted on said side wall, an indicator comprising an arm, said arm being pivoted by means of the said pin, a spring strip permanently attached to the wall providing means to retain the indicator arm in indicating positions, said spring strip being provided with an aperture to engage said pin, a knob formed intermediate the ends of said strip to provide means for releasing the indicator arm.

In testimony whereof I affix my signature hereto.

ROY E. GREEN.